United States Patent
Hirano

[19]

[11] Patent Number: 5,975,481
[45] Date of Patent: Nov. 2, 1999

[54] BATTERY HOLDING STRUCTURE

[75] Inventor: Masayuki Hirano, Tokyo, Japan

[73] Assignee: Matsushita Electric Inudstrial Co., Ltd., Osaka, Japan

[21] Appl. No.: 09/081,781

[22] Filed: May 20, 1998

[51] Int. Cl.$^6$ .................................................. H01M 2/10
[52] U.S. Cl. .................... 248/694; 312/223.2; 429/96; 429/100
[58] Field of Search ................. 429/96, 97, 100; 248/222.51, 221.11, 316.1, 316.5, 500, 346.03, 154, 68.1, 74.1, 694; 312/223.2

[56] References Cited

U.S. PATENT DOCUMENTS

| | | | |
|---|---|---|---|
| 1,911,380 | 5/1933 | McFarlin | 248/316.1 |
| 2,880,951 | 4/1959 | Springer | 248/154 X |
| 3,017,598 | 1/1962 | Low | 248/316.1 X |
| 3,088,992 | 5/1963 | Lyman, Jr. | 429/100 |
| 3,186,051 | 6/1965 | Waddell | 248/68.1 X |
| 4,681,388 | 7/1987 | Nakazawa et al. | 248/74.1 X |
| 5,123,619 | 6/1992 | Tomlinson et al. | 248/74.1 |
| 5,267,714 | 12/1993 | Nelson et al. | 248/222.51 |
| 5,637,417 | 6/1997 | Engmark et al. | 429/96 X |

Primary Examiner—Derek J. Berger
Attorney, Agent, or Firm—Louis Woo

[57] ABSTRACT

A wall of a casing has first and second threaded holes. A retaining member is rotatable between a normal position and a disabled position. The retaining member has a hole and a groove. A mechanism operates for enabling the retaining member to fasten the battery to the casing wall when the retaining member is in the normal position. The mechanism includes first and second screws. The first screw extends through the hole of the retaining member, and extends into the first threaded hole in the casing wall and is connected to the casing wall. The first screw has a head engageable with the retaining member. The second screw extends through the groove in the retaining member when the retaining member is in the normal position. The second screw extends into the second threaded hole in the casing wall, and is connected to the casing wall. The second screw has a head engageable with the retaining member. When the first and second screws are loosened, the retaining member is rotatable about the first screw between the normal position and the disabled position. The retaining member is engageable with the battery when being in the normal position. The retaining member is separated from the battery and is prevented from interfering with removal of the battery when being in the disabled position. The second screw relatively moves out of the groove in the retaining member as the retaining member rotates from the normal position to the disabled position.

3 Claims, 5 Drawing Sheets

BATTERY HOLDING STRUCTURE

BACKGROUND OF THE INVENTION

1. Field of the Invention

This invention relates to a battery holding structure which can be used in electronic devices and electronic apparatuses.

2. Description of the Relate Art

Some electronic devices have casings in which batteries are disposed. It is known that an elastic belt binds such a battery to the walls of a casing. The elastic belt enables easy replacement of the battery by a new one.

A known battery holding structure includes a retainer screwed to the walls of a casing. The retainer fastens a battery to the casing walls. When the battery is replaced by a new one, it is necessary to completely detach screws and the retainer from the casing walls. After the battery is removed and a new one is set in position therefor, it is necessary to connect the screws and the retainer to the casing walls again. Accordingly, in the known battery holding structure, the replacement of the battery by a new one tends to be troublesome. In addition, there is a chance of losing the screws or the retainer.

SUMMARY OF THE INVENTION

It is an object of this invention to provide an improved battery holding structure.

A first aspect of this invention provides a structure for holding a battery in a casing which comprises a wall of the casing which has first and second threaded holes: a retaining member rotatable between a normal position and a disabled position, and having a hole and a groove; and means for enabling the retaining member to fasten the battery to the casing wall when the retaining member is in the normal position, the means including first and second screws; the first screw extending through the hole of the retaining member, and extending into the first threaded hole in the casing wall and being connected to the casing wall, the first screw having a head engageable with the retaining member; the second screw extending through the groove in the retaining member when the retaining member is in the normal position, the second screw extending into the second threaded hole in the casing wall and being connected to the casing wall, the second screw having a head engageable with the retaining member; wherein when the first and second screws are loosened, the retaining member is rotatable about the first screw between the normal position and the disabled position, wherein the retaining member is engageable with the battery when being in the normal position, wherein the retaining member is separate from the battery and is prevented from interfering with removal of the battery when being in the disabled position, and wherein the second screw relatively moves out of the groove in the retaining member as the retaining member rotates from the normal position to the disabled position.

A second aspect of this invention is based on the first aspect thereof, and provides a structure further comprising a stopper formed on the casing wall, the stopper engaging the retaining member and preventing rotation of the retaining member when the retaining member is in the normal position and the screws are tightened.

A third aspect of this invention provides a structure for holding a battery in a casing of an electronic device which comprises first and second bosses formed on the casing and having respective threaded holes; a stopper pin formed on the casing; a retaining member holding the battery and fastening the battery to the casing, the retaining member having an attachment portion and an L-shaped hold portion, the attachment portion having a hole and a U-shaped groove, the attachment portion having a contact portion for engagement with the stopper pin, the hold portion extending from the attachment portion and holding the battery; a first screw extending into the threaded hole in the first boss through the hole in the retaining member to connect the retaining member to the first boss; and a second screw extending into the threaded hole in the second boss through the U-shaped groove in the retaining member to connect the retaining member to the second boss; wherein engagement between the contact portion and the stopper pin and connection of the retaining member to the second boss via the second screw prevent rotation of the retaining member, wherein the contact portion is movable out of engagement with the stopper pin and the retaining member is disconnectable from the second boss when the first and second screws are loosened to a given extent, and wherein the retaining member is rotatable about the first screw to allow removal of the battery while the first and second screws remain in connection with the first and second bosses in cases where the first and second screws are loosened to the given extent.

DESCRIPTION OF THE PREFERRED EMBODIMENT

A prior-art battery holding structure will be explained hereinafter for a better understanding of this invention.

Figure 1:
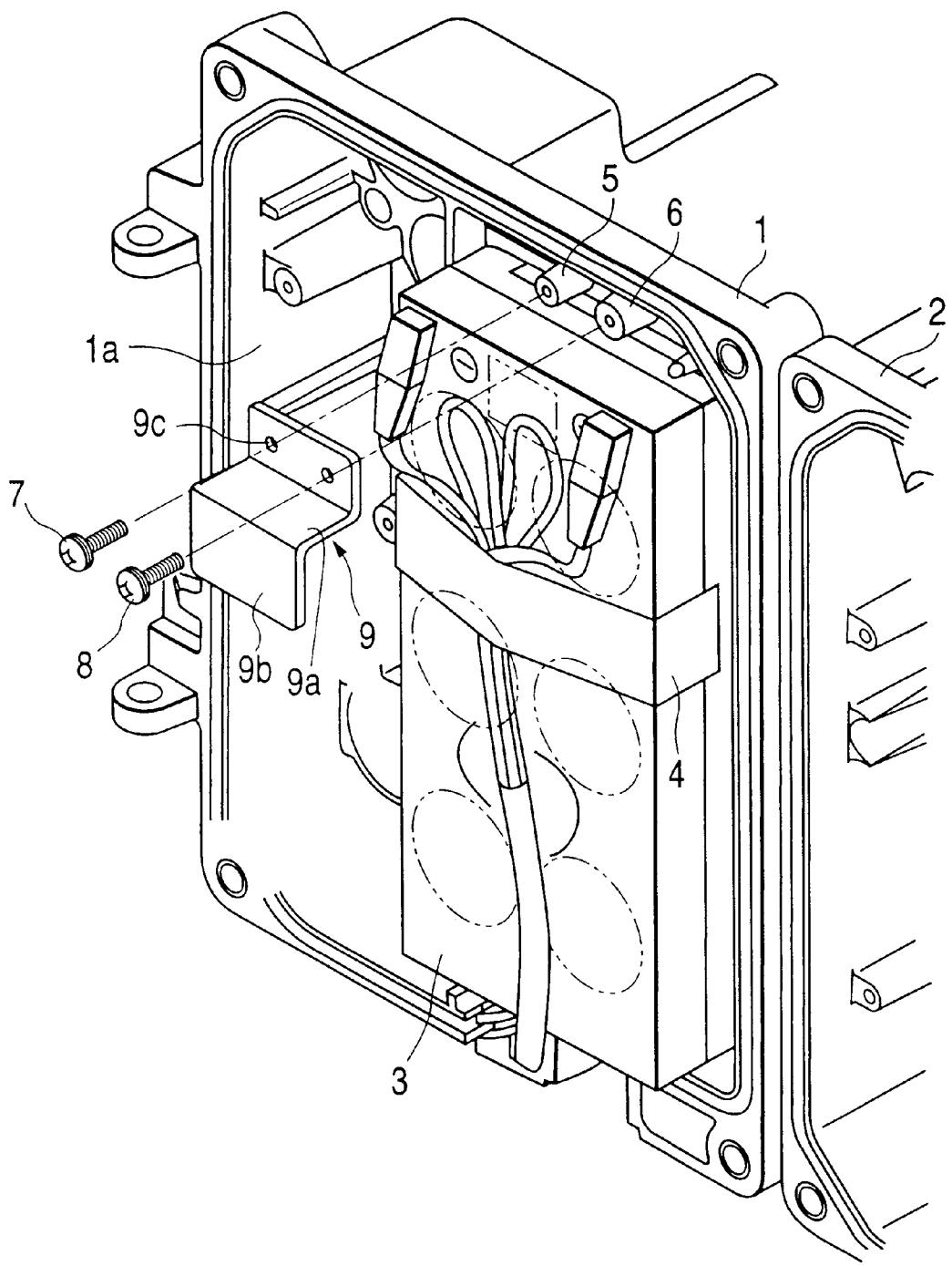
FIG. 1 is an exploded view of a portion of a prior-art electronic device.

FIG. 1 shows a prior-art electronic device or apparatus including a prior-art battery holding structure. The prior-art electronic device of FIG. 1 has a box-like casing composed of a body 1 and a lid 2. A side of the casing lid 2 is hinged to a side of the casing body 1. The casing lid 2 can swing relative to the casing body 1 between a closed position and a fully open position. The casing lid 2 covers an open end of the casing body 1 when assuming its closed position. The open end of the casing body 1 is exposed when the ncasing lid 2 assumes its fully open position.

The casing body 1 has a recess 1a extending from the open end thereof. When the casing lid 2 assumes its closed position, the recess 1a forms a portion of an interior or an inner space within the casing.

A battery 3 is disposed in the recess 1a of the casing body 1. Normally, an elastic belt 4 binds the battery 3 to the walls of the casing body 1. Two ends of the elastic belt 4 are connected to the walls of the casing body 1. The battery 3 can be moved into and out of a normal position where the battery 3 is bound to the walls of the casing body 1 by the belt 4. In general, the belt 4 is deformed when the battery 3 is moved into and out of its normal position. Thus, the battery 3 can be released from the belt 4.

The walls of an upper portion of the casing body 1 are formed with a pair of bosses 5 and 6 extending in the recess 1a. The bosses 5 and 6 have threaded holes respectively.

Figure 2:
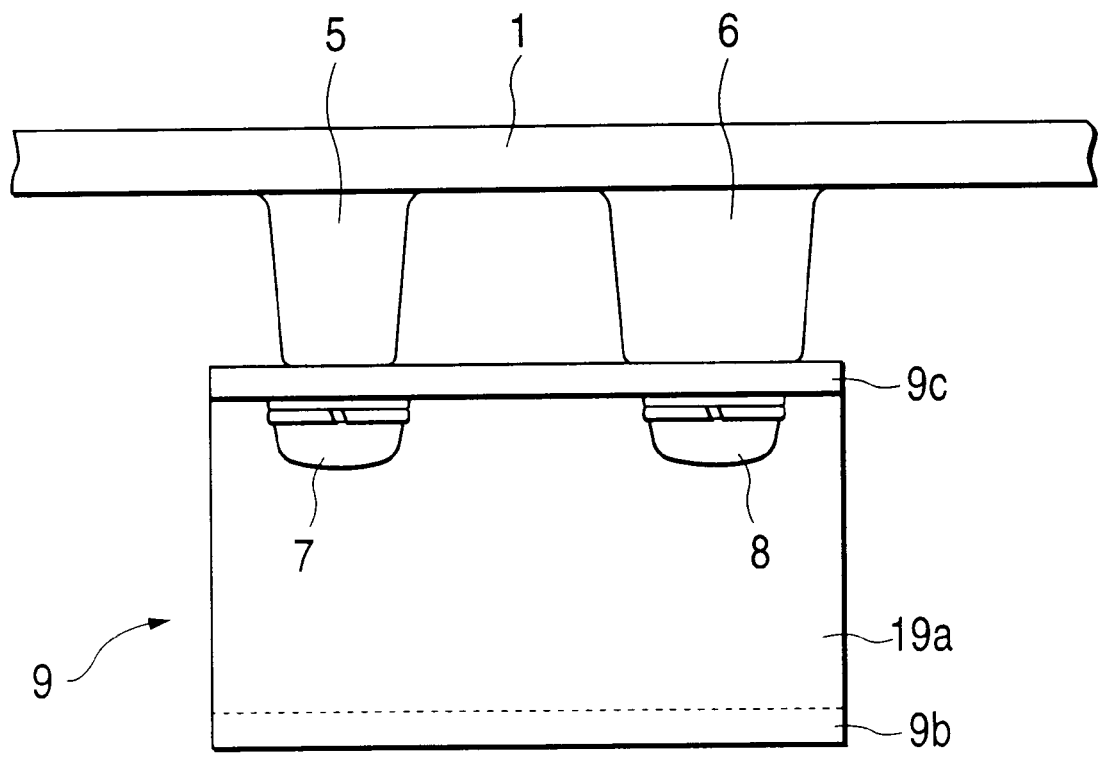
FIG. 2 is a plan view of a portion of the prior-art electronic device in FIG. 1.

With reference to FIGS. 1 and 2, the prior-art battery holding structure includes a retaining member 9 made of metal. The retaining member 9 has an intermediate portion 9a, an engagement portion 9b, and an attachment portion 9c. The engagement portion 9b and the attachment portion 9c are perpendicular to the intermediate portion 9a. The engagement portion 9b and the attachment portion 9c extend from opposite edges of the intermediate portion 9a in opposite directions respectively. The attachment portion 9c has a pair of holes through which screws 7 and 8 extend respectively. The screws 7 and 8 extend into the threaded holes in the bosses 5 and 6, and thereby engage the walls of the bosses 5 and 6 which define the threaded holes. Heads of the screws 7 and 8 engage the attachment portion 9c. Normally, the attachment portion 9c is fixed to the bosses 5 and 6 by the screws 7 and 8. Normally, the engagement portion 9b and the intermediate portion 9a cooperate to hold a corner of an upper end of the battery 3 with respect to the walls of the casing body 1. Specifically, the engagement portion 9b presses a part of the front surface of the upper end of the battery 3 against the walls of the casing body 1 while the intermediate portion 9a engages a part of the upper end surface of the battery 3. Thus, the retaining member 9 fastens the battery 3 to the walls of the casing body 1.

In this way, the battery 3 is firmly held in its normal position relative to the walls of the casing body 1 by the retaining member 9 and the belt 4.

In the prior-art electronic device of FIGS. 1 and 2, the battery 3 is replaced by a new one as follows. The casing lid 2 is moved to its fully open position. The screws 7 and 8 are loosened and are moved out of the threaded holes of the bosses 5 and 6 so that the retaining member 9 is completely detached and separated from the bosses 5 and 6 and the battery 3. Thus, the battery 3 is released from the retaining member 9. Subsequently, the battery 3 is removed from the belt 4. A new battery is set in a normal position where the new battery is bounded to the walls of the casing body 1 by the belt 4. Then, the screws 7 and 8 are passed through the holes in the attachment portion 9c of the retaining member 9. Ends of the screws 7 and 8 are placed at the inlets of the threaded holes in the bosses 5 and 6 while the screws 7 and 8 are aligned with the threaded holes. Subsequently, the screws 7 and 8 are tightened so that the retaining member 9 fastens the new battery to the walls of the casing body 1.

In the prior-art electronic device of FIGS. 1 and 2, during the replacement of the battery 3 by a new one, it is necessary to completely detach the screws 7 and 8 and the retaining member 9 from the bosses 5 and 6 of the casing body 1 before the battery 3 is removed from its normal position. It is necessary to place the screws 7 and 8 into the threaded holes in the bosses 5 and 6 again after a new battery is set in position. Accordingly, in the prior-art electronic device of FIGS. 1 and 2, the replacement of the battery 3 by a new one tends to be troublesome. In addition, there is a chance of losing the screws 7 and 8 or the retaining member 9.

EMBODIMENT

Figure 3:
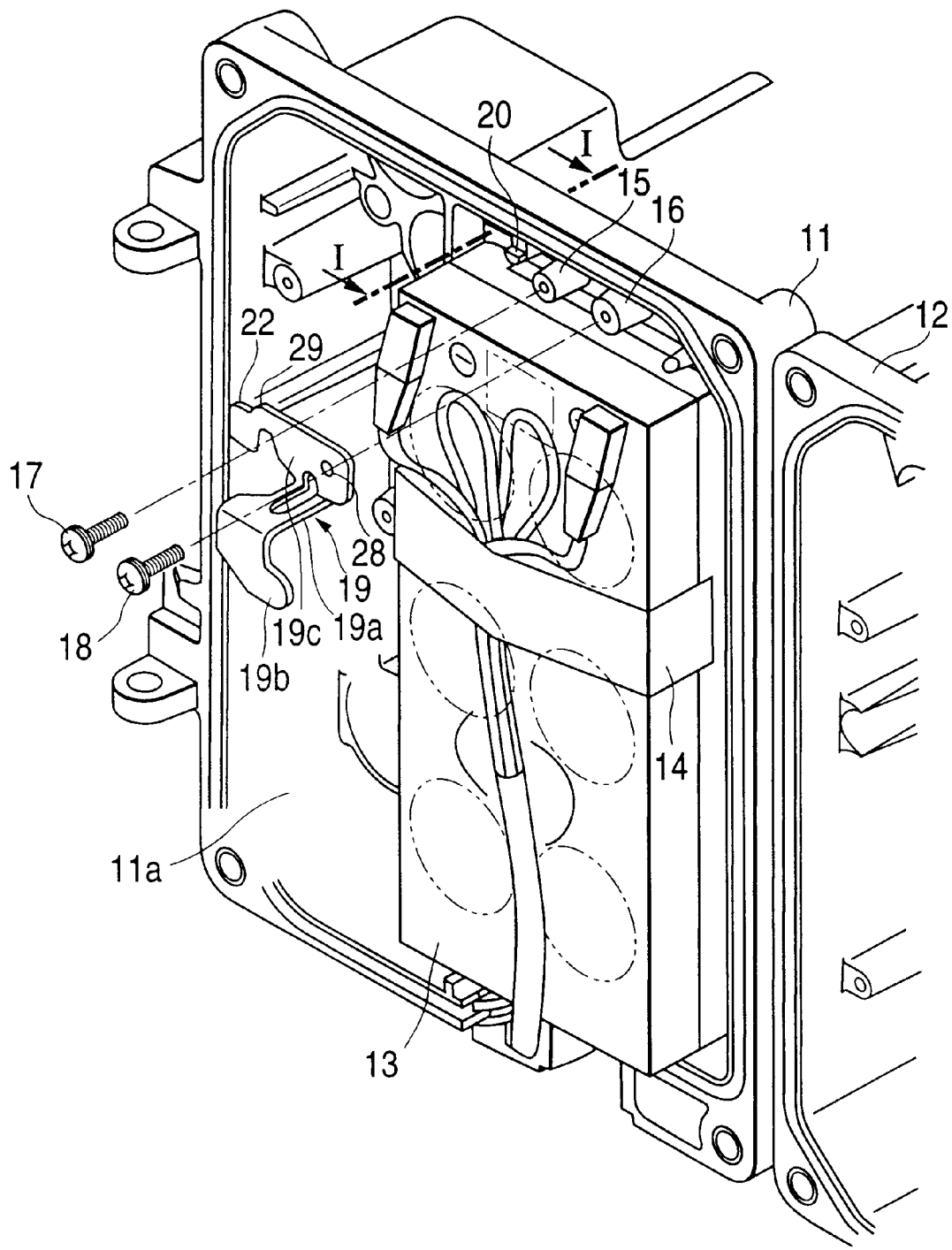
FIG. 3 is an exploded view of a portion of an electronic device including a battery holding structure according to an embodiment of this invention.
Figure 4:
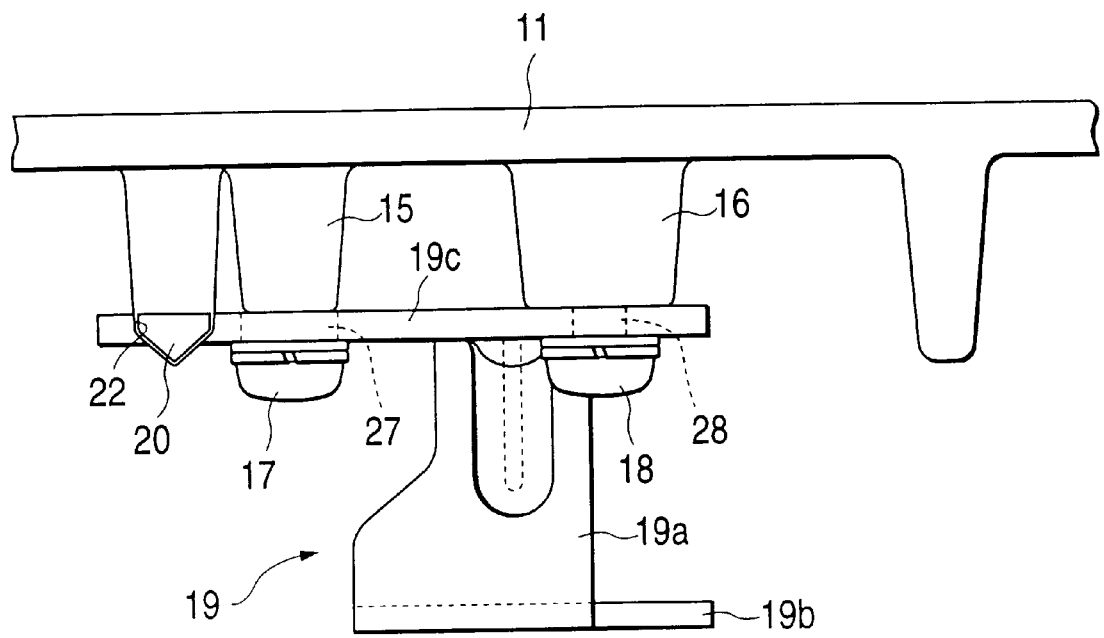
FIG. 4 is a plan view of a portion of the battery holding structure in FIG. 3.
Figure 5:
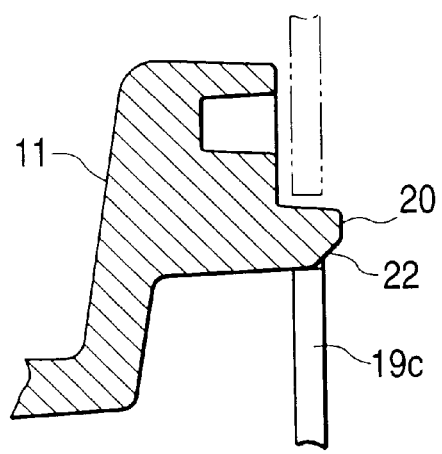
FIG. 5 is a sectional view taken along the line I—I in FIG. 3.
Figure 6:
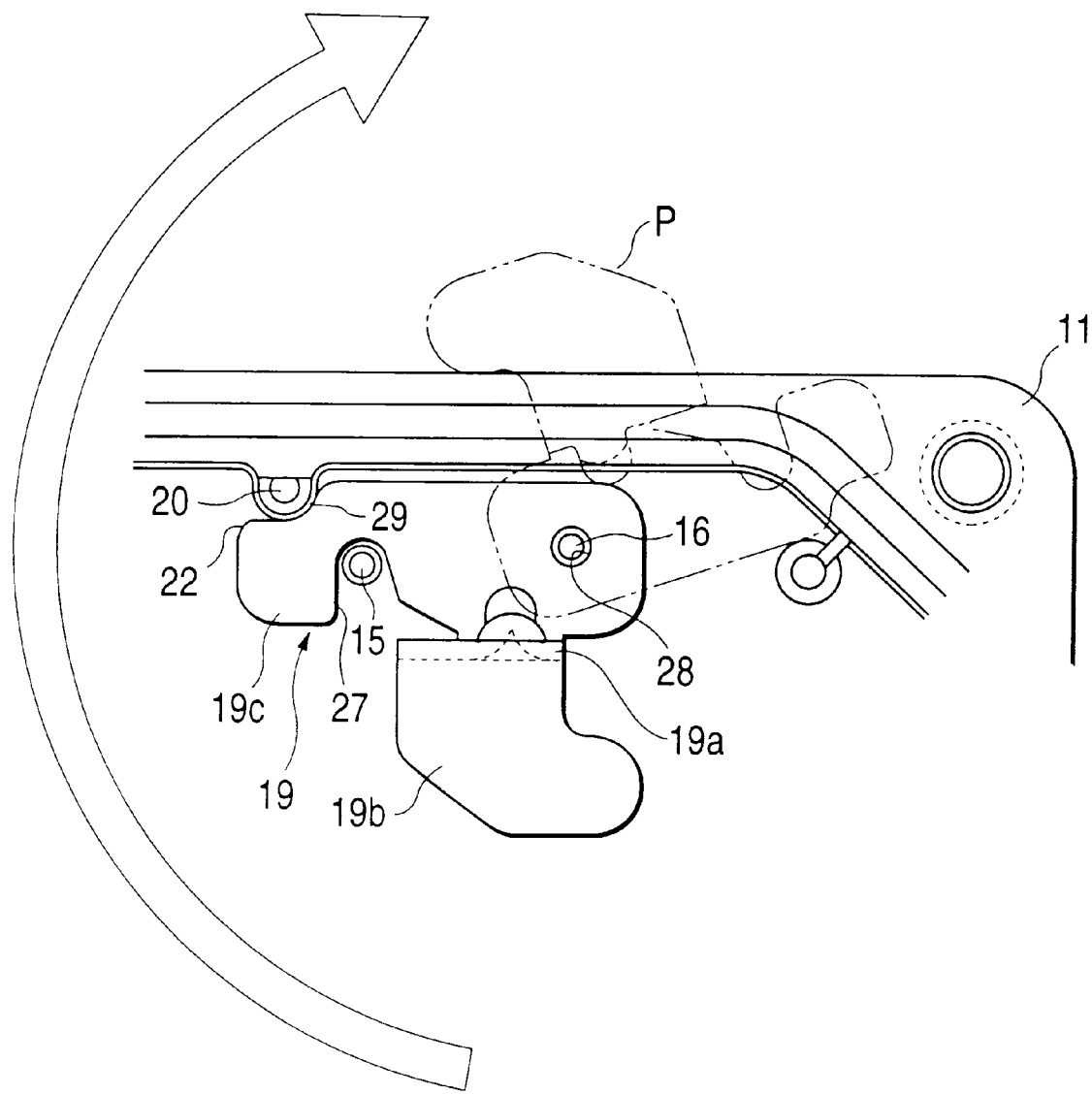
FIG. 6 is a plan view of a portion of the battery holding structure in FIG. 3.

FIG. 3 shows an electronic device or apparatus including a battery holding structure according to an embodiment of this invention.

The electronic device of FIG. 3 has a box-like casing composed of a body 11 and a lid 12. A side of the casing lid 12 is hinged to a side of the casing body 11. The casing lid 12 can swing relative to the casing body 11 between a closed position and a fully open position. The casing lid 12 covers an open end of the casing body 11 when assuming its closed position. The open end of the casing body 11 is exposed when the casing lid 12 assumes its fully open position.

The casing body 11 has a recess 11a extending from the open end thereof. When the casing lid 12 assumes its closed position, the recess 11a forms a portion of an interior or an inner space within the casing.

A battery 13 is disposed in the recess 11a of the casing body 11. Normally, an elastic belt 14 binds the battery 13 to the walls of the casing body 11. Two ends of the elastic belt 14 are connected to the walls of the casing body 11. The battery 13 can be moved into and out of a normal position where the battery 13 is bound to the walls of the casing body 11 by the belt 14. In general, the belt 14 is deformed when the battery 13 is moved into and out of its normal position. Thus, the battery 13 can be released from the belt 14.

The walls of an upper portion of the casing body 11 are formed with a pair of bosses 15 and 16 extending in the recess 11a. The bosses 15 and 16 have threaded holes respectively.

With reference to FIGS. 3, 4, 5, and 6, the battery holding structure includes a retaining member 19 made of suitable material such as metal or resin. As will be made clear later, the retaining member 19 can be rotated between a normal position and a disabled position. The retaining member 19 has an intermediate portion 19a, an engagement portion 19b, and an attachment portion 19c. The engagement portion 19b and the attachment portion 19c are perpendicular to the intermediate portion 19a. The engagement portion 19b and the attachment portion 19c extend from opposite edges of the intermediate portion 19a in opposite directions respectively. The attachment portion 19c has an U-shaped groove through which a screw 17 extends when the retaining member 19 is in its normal position. The attachment portion 19c has a hole 28 through which a screw extends. The screws 17 and 18 extend into the threaded holes in the bosses 15 and 16, and thereby engage the walls of the bosses 15 and 16 which define the threaded holes therein. Thus, the screws 17 and 18 are connected to the bosses 15 and 16 respectively. In the case where the screws 17 and 18 are tightened when the retaining member 19 is in its normal position, heads of the screws 17 and 18 engage the attachment portion 19c. Accordingly, in this case, the screws 17 and 18 fix or firmly connect the attachment portion 19c to the bosses 15 and 16. The engagement portion 19b and the intermediate portion 19a form an L-shaped portion for retaining the battery 13. Normally, the engagement portion 19b and the intermediate portion 19a cooperate to hold a corner of an upper end of the battery 13 with respect to the walls of the casing body 11. Specifically, the engagement portion 19b presses a part of the front surface of the upper end of the battery 13 against the walls of the casing body 11 while the intermediate portion 19a engages a part of the upper end surface of the battery 13. In this way, the retaining member 19 serves to fasten the battery 13 to the walls of the casing body 11.

The walls of the upper portion of the casing body 11 are formed with a stopper pin 20 extending in the recess 11a. The stopper pin 20 is located relative to the bosses 15 and 16 such that the boss 15 extends between the stopper pin 20 and the boss 16. The attachment portion 19c of the retaining member 19 has a contact portion 22 which can engage or meet the stopper pin 20. The contact portion 22 and the groove 27 are located at opposite sides of the attachment portion 19c of the retaining member 19, respectively. The contact portion 22 includes a tapered portion or a curved portion 29 which enables the contact portion 22 to smoothly fall into engagement with the stopper pin 20.

Normally, the contact portion 22 of the retaining member 19 is in engagement with the stopper pin 20. The engagement between the stopper pin 20 and the contact portion 22 of the retaining member 19, and the connection between the boss 16 and the attachment portion 19c of the retaining member 19 cooperate to prevent clockwise rotation of the retaining member 19 from its normal position. The connection between the boss 15 and the attachment portion 19c of the retaining member 19, and the connection between the boss 16 and the attachment portion 19c of the retaining member 19 cooperate to prevent counterclockwise rotation of the retaining member 19 from its normal position.

In the electronic device of FIGS. 3–6, the battery 13 is replaced by a new one as follows. The casing lid 12 is moved to its fully open position. The screws 17 and 18 are loosened to a given extent where the screws 17 and 18 remain in engagement with the bosses 15 and 16. The retaining member 19 is pulled and moved from its lowermost position. During this movement of the retaining member 19, the contact portion 22 of the retaining member 19 moves out of engagement with the stopper pin 20. Then, the retaining member 19 is rotated clockwise about the screw 18 from its angularly normal position to a disabled position "P" (see FIG. 6). Thus, the retaining member 19 is completely separated and detached from the battery 13. In other words, the battery 13 is released from the retaining member 19. During the clockwise rotation of the retaining member 19 to its disabled position "P", the screw 17 relatively moves out of the groove 27 in the attachment portion 19c of the retaining member 19. The retaining member 19 does not interfere with removal of the battery 13 from its normal position when being in the disabled position "P". Subsequently, the battery 13 is removed from the belt 14. A new battery is moved to a normal position where the new battery is bounded to the walls of the casing body 11 by the belt 14. Then, the retaining member 19 is rotated counterclockwise from its disabled position "P" about the screw 18 until the screw 17 relatively moves into the groove 27 in the attachment portion 19c of the retaining member 19. Preferably, the counterclockwise rotation of the retaining member 19 is continued until the retaining member 19 meets the screw 17. Subsequently, the screws 17 and 18 are tightened and the retaining member 19 is driven downward to its lowermost position at which the retaining member 19 fastens the new battery to the walls of the casing body 11 and the contact portion 22 of the retaining member 19 engages the stopper pin 20 on the casing body 11.

During the replacement of the battery 13 by a new one, it is unnecessary to separate the screws 17 and 18 from the threaded holes in the bosses 15 and 16 before removal of the battery 13. In addition, it is unnecessary to place the screws 17 and 18 into the threaded holes in the bosses 15 and 16 again after a new battery is set in position. Accordingly, battery replacement in the electronic device of FIGS. 3–6 is easier than that in the prior-art electronic device of FIGS. 1 and 2. Furthermore, it is possible to remove a chance of losing the screws 17 and 18 or the retaining member 19 during replacement of the battery 13 by a new one.

What is claimed is:

1. In a casing containing a battery, a structure for holding the battery in the casing, comprising:

a wall of the casing which has first and second threaded holes;

a retaining member rotatable between a normal position and a disabled position, and having a hole and a groove; and means for enabling the retaining member to fasten the battery to the casing wall when the retaining member is in the normal position, the means including first and second screws;

the first screw extending through the hole of the retaining member, and extending into the first threaded hole in the casing wall and being connected to the casing wall, the first screw having a head engageable with the retaining member;

the second screw extending through the groove in the retaining member when the retaining member is in the normal position, the second screw extending into the second threaded hole in the casing wall and being connected to the casing wall, the second screw having a head engageable with the retaining member;

wherein when the first and second screws are loosened, the retaining member is rotatable about the first screw between the normal position and the disabled position, wherein the retaining member is engageable with the battery when being in the normal position, wherein the retaining member is separated from the battery and is prevented from interfering with the removal of the battery when being in the disabled position, and wherein the second screw relatively moves out of the groove in the retaining member as the retaining member rotates from the normal position to the disabled position.

2. A structure as recited in claim 1, further comprising a stopper formed on the casing wall, the stopper engaging the retaining member and preventing rotation of the retaining member when the retaining member is in the normal position and the screws are tightened.

3. In a casing of an electronic device containing a battery, a structure for holding the battery in the casing, comprising:

first and second bosses formed on the casing and having respective threaded holes;

a stopper pin formed on the casing;

a retaining member holding the battery and fastening the battery to the casing, the retaining member having an attachment portion and an L-shaped hold portion, the attachment portion having a hole and a U-shaped groove, the attachment portion having a contact portion for engagement with the stopper pin, the hold portion extending from the attachment portion and holding the battery;

a first screw extending into the threaded hole in the first boss through the hole in the retaining member to connect the retaining member to the first boss; and a second screw extending into the threaded hole in the second boss through the U-shaped groove in the retaining member to connect the retaining member to the second boss;

wherein engagement between the contact portion and the stopper pin and connection of the retaining member to the second boss via the second screw prevent rotation of the retaining member, wherein the contact portion is movable out of engagement with the stopper pin and the retaining member is disconnectable from the second boss when the first and second screws are loosened to a given extent, and wherein the retaining member is rotatable about the first screw to allow removal of the battery while the first and second screws remain in connection with the first and second bosses in cases where the first and second screws are loosened to the given extent.

* * * * *